United States Patent [19]
Stoll

[11] Patent Number: 4,709,945
[45] Date of Patent: Dec. 1, 1987

[54] PRISMATIC CONNECTION MEMBER FOR THE SUPPLY OF VALVES OR THE LIKE

[76] Inventor: Kurt Stoll, Lenzhalde 72, 7300 Esslingen, Fed. Rep. of Germany

[21] Appl. No.: 892,509

[22] Filed: Aug. 1, 1986

[30] Foreign Application Priority Data

Aug. 16, 1985 [DE] Fed. Rep. of Germany ....... 3529276

[51] Int. Cl.$^4$ .............................................. F16L 39/00
[52] U.S. Cl. .......................................... 285/4; 285/12; 285/137.1; 285/901
[58] Field of Search ....................... 285/12, 137.1, 4, 3, 285/901

[56] References Cited

U.S. PATENT DOCUMENTS

| | | | |
|---|---|---|---|
| 986,905 | 3/1911 | Carlson | 285/4 |
| 1,306,641 | 6/1919 | Steenstrup | 285/901 X |
| 2,159,811 | 5/1939 | Leonardo | 285/12 |
| 3,217,710 | 11/1965 | Beall et al. | 285/4 X |
| 3,294,225 | 12/1966 | Kenyon | 285/4 X |
| 3,406,989 | 10/1968 | Gross | 285/137.1 |
| 3,513,849 | 5/1970 | Vaillancourt et al. | 285/901 X |
| 3,731,954 | 5/1973 | Haglund | 285/12 |
| 3,945,163 | 3/1976 | Nagler et al. | 285/4 X |
| 4,133,312 | 1/1979 | Burd | 285/12 X |
| 4,247,133 | 1/1981 | Moller | 285/4 |

FOREIGN PATENT DOCUMENTS 760274 10/1956 United Kingdom ............. 285/137.1

*Primary Examiner*—Thomas F. Callaghan
*Attorney, Agent, or Firm*—McGlew and Tuttle

[57] ABSTRACT

It is a question of a valve subplate on which valves or other components may be mounted. The subplate has a prismatic, i.e. plate- or block-like form, and serves for the supply of the valves or similar components through at least one internal duct, when opens at one end at a mounting surface adapted for the attachment of the valves, and at the other end at a connection side of the connection member for joining with a pressure fluid line or the like. At its end arranged on the connection side the duct is connected with a duct section having a threaded socket extending thereinto and also with an outwardly projecting male nipple extending from the connection side and formed integrally therewith and adjoining for example a further duct section coaxially or parallel to the axis thereof so that the nipple is connected with the said duct, and a pressure lead or the like may selectively connected with the threaded socket by virtue of the screw threads thereon or slipped onto the male nipple.

20 Claims, 2 Drawing Figures

PRISMATIC CONNECTION MEMBER FOR THE SUPPLY OF VALVES OR THE LIKE

BACKGROUND OF THE INVENTION

The invention relates to a prismatic, i.e. plate- or block-like connection member or subplate for the supply of valves or similar components, having at least one internal duct, which opens at one end at a mounting surface adapted for the attachment of the valves, and at the other end at a connection side of the connection member for joining with a pressure fluid line or the like.

Connection members of this sort are used in pneumatic circuitry to reduce the amount of pressure fluid lines or hose, to facilitate the fitting of valves or similar components and for the rapid and error-free connection of the pressure fluid lines with the valves. In such a case the connection member normally has more than one duct extending through it, which at one end opens at the mounting surface and at the other at the connection side of the connection member. Valves or similar components may be attached by screw or plug means on the mounting surface and in the mounted condition valve ducts formed in the interior of the valves are in communication with the separate ducts via the orifices formed on the mounting surface. It is certainly possible for more than one valve to be arranged on the mounting surface, and then the ducts will have more than one orifice at the mounting surface, or the separate valves may have respectively separate ducts. Each duct will then have one orifice on the connection side, which will have a threaded means into which the threaded end of a pressure lead may be screwed. The lead will be connected with a supply of fluid under pressure, with a load or with a duct through which fluid may be discharged, as for example into the atmosphere in the case of the use of compressed air as a driving fluid. Frequently, however, it will be the case that a lead to be connected is not equipped with any screw means, as will be the case if it is made of a rubber-like, elastic material, and then a hose connection nipple will have to be screwed into the orifice, such nipple having a suitable thread at one end for fitting into the threaded socket and on the other end it will have the tapering male nipple element for insertion into the elastic fluid lead. However this system is an awkward one inasmuch as a large number of hose connection nipples of the sort noted have to be kept available and possibly carried around by a fitter in order to meet any eventuality. Furthermore, there will be substantial costs involved in the separate production of the hose connection elements and in stockholding activities in this respect. It is furthermore to be considered that in systems utilizing such hose connection nipples, leakage problems will be relatively frequent, since there are two points to be sealed, namely on the one hand at the thread and on the other hand at the connection nipple.

SHORT SUMMARY OF THE INVENTION

One object of the present invention is to overcome the untoward effects of such systems hitherto utilized.

A further object of the invention is to devixe a connection member of the sort initially specified herein which, while having a simple structure, makes possible the connection of pressure leads with the alternatives of screw or plung connection means with the respective ducts or passages in the connection member.

A further aim of the present invention in this respect is to provide such a connection member that is cheap to produce.

A still further aim of the invention is to reduce sealing problems in the form of leaks.

A still further aim of the invention is to ensure reduced costs of warehousing parts of the systems.

In order to achieve these or other objects appearing in the course of the instant specification and claims, in the invention at its end arranged on the connection side at least one duct is connected with a duct section having a threaded socket extending thereinto and also with an outwardly projecting male nipple extending from the connection side and formed integrally therewith and adjoining for example a further duct section coaxial or parallel to the axis thereof so that the nipple is connected with the said duct, and the pressure lead or the like may be selectively connected with the threaded socket by virtue of the screw threads thereon or plugged onto the male nipple. In this respect it is convenient if on the connection side the duct is provided with two separate orifices, of which one is connected with the threaded socket and the other is connected with the male nipple; or alternatively it is possible for the duct to have only one single orifice on the connection side, which is connected with both the threaded socket and also the male nipple associated therewith. It is therefore then possible for a pressure fluid lead to be selectively coupled with the a duct by way of the threaded socket using a screw means or by way of the male nipple using a plug connection. The two possibilities will be available in all cases. If there are a plurality of ducts, it will even be possible for one pressure lead to be connected with the one duct via a screw connection means and for another fluid lead to be connected with another duct via a plug connection. This is more especially an advantage if there is no possibility of altering the forms of the pressure leads and it is desired to equip such a pre-existing system with the connection member in accordance with the invention. The costs for warehousing parts are considerably reduced in the present invention, since it is solely the connection member itself which has to be stocked, and no separate additional fittings therefor. Furthermore, the problem of leaks is tackled to a substantial extent inasmuch as the respective pressure fluid duct is able to be directly connected with the connection member as such whatever its particular design and without the intermediate provision of separate male hose nipples.

Advantageous further developments of the invention are covered by the claims.

In accordance with a preferred feature of the invention, the two orifices of the one or more ducts are placed directly or otherwise adjacent on a common side of the connection member. This makes possible a low loss flow whatever the type of connection means used.

In order to make possible removal of the male hose nipple if it should turn out not to be required, at least one duct may have a single orifice on the connection side, which is associated not only with the threaded socket but also with the male nipple. It is more especially in connection with the provision of a single orifice on the connection side or with the provision of two separate orifices of a duct on the connection side of which one is connected with the threaded socket and the other orifice is associated with the male nipple, that the possibility of breaking off, the male nipple offers optimum access to the threaded socket. If the duct has two orifices on the connection side it is then possible for the orifice which is not used to be shut off by the insertion of a sealing plug, if the at least one duct on the connection side has a single orifice, which is associated both with the threaded socket and also with the male nipple.

In accordance with further developments of the invention the male nipple, the threaded socket and the associated orifices are placed coaxially in relation to each other, the male nipple is molded on the connection side of the connection member so that it is able to be snapped off, i.e. it is frangible, and for this purpose may be made with a line of weakness which is in the form of a circumferential groove formed in the outer face of the male nipple.

These further features of the invention make possible a simple breaking off of the male nipple at a precisely defined point. The line of weakness may be an internal groove which is concentric with respect to the outer circumferential groove and is formed in the inner face of the passage through the male nipple. This makes it possible for the point of frangible weakness to be located directly on the connection side so that it is possible for the male nipple to be broken off free of sharp edges, and then a plug may be inserted into it or a fluid pressure line may be screwed into position without any leakage problems.

It is also possible for the point of weakness or the circumferential grooves associated therewith to be provided adjacent to the plug at the end or the orifice associated therewith. This is a way of securely fixing a fluid duct which has been plugged onto a male nipple, since the retainer edge thereon may bite into the inner face of the soft fluid lead with a sort of barb connection. There is then no chance of the pressure fluid line accidentally slipping off the male nipple.

It is furthermore possible for the point of weakness to be directly adjacent to the plug-on end or the orifice thereat so that the male nipple may be broken off without leaving any sharp edges. The male nipple may have at least one external coaxially formed and radially projecting barb ring with a saw-tooth cross section for the pressure fluid line having elastic properties like those of rubber. Such features are advantageous when it comes to sealing off a no longer used orifice which was originally provided with a male nipple. After breaking off the male nipple, a sealing plug may be permanently or temporarily inserted into the duct. If however the male nipple is to be used, it is an advantage to make use of a further feature of the invention in accordance with which a sealing plug may be inserted into the duct extending from the second orifice connected with the male nipple. The orifice of the duct having a threaded socket may then also be sealed off.

Since any unused male nipple may be broken off so that it is no longer a superfluous feature, the connection member of the invention will not have any projecting parts otherwise likely to cause obstruction and a group of connection members may be compactly placed close to each other.

In accordance with further features of the invention the sealing plug may be temporarily introduced into the duct or be bonded in place therein, and a screw plug may be screwed into the threaded socket so as to seal off the respective orifice thereof. Furthermore, the connection member of the invention may be produced of synthetic resin or of hard rubber material. It may be injection molded or cast. These features contribute to a low cost of production of the connection member of the invention, which consists of only one single integral structure. Even during production in a factory it is possible for the male nipple to be molded integrally and also the threaded socket may be produced by having a suitable design of the casting mold. Furthermore it is in some cases possible to dispense with any separate sealing means for the threaded socket if it is so matched to the thread of the ferrule on the lead to be screwed into it that the latter more or less bites into the material of the socket.

One particular advantage of the connection member of the present invention is that even with one single component it is possible for more than one form of connection to be catered for, which otherwise makes a large number of different fittings necessary.

An account will now be given of two possible working examples of the invention with indications of possible variations therein with reference to the accompanying drawings.

LIST OF THE SEVERAL FIGURES OF THE DRAWING

DETAILED ACCOUNT OF WORKING EXAMPLES OF THE INVENTION

Figure 1:
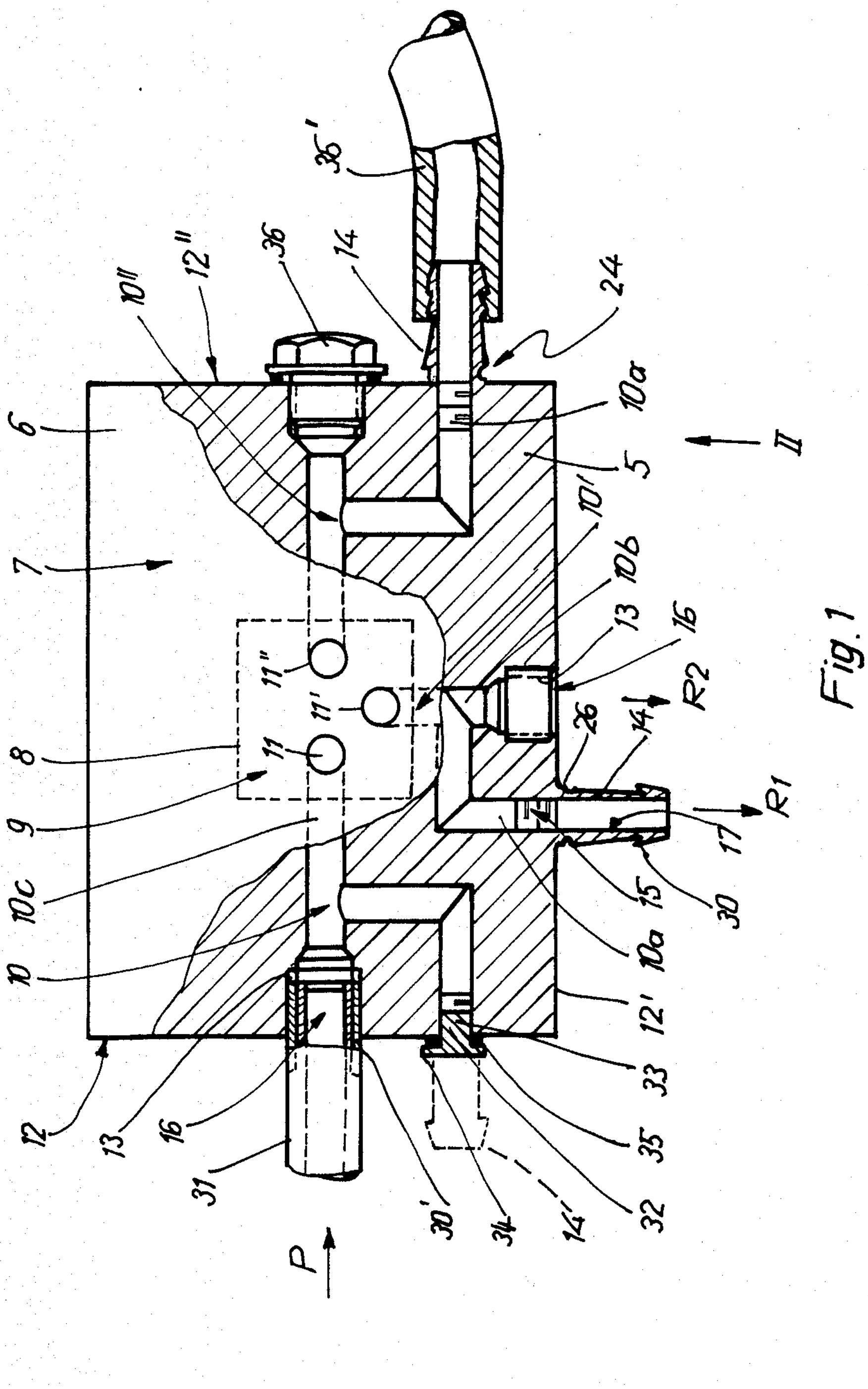
FIG. 1 shows a first working example contemplated by the invention in the form of a connection member as seen partly broken away from above, a valve mounted on the mounting surface being indicated in outline in broken lines, the ducts in the connection member each having two orifices.

The connection members 5 and 5' illustrated, have the form of a plate with sides at right angles to each other. One of the sides 6 with a large area is in the form of a flat mounting surface 7 for the attachment of fluid power components, more especially in the form of valves. In the present working examples a valve 8, whose outline is marked in broken lines, is mounted on the mounting surface 7 so that the valve is above the plane of the drawing. It is connected in some convenient way with the connection member 5 detachably, as for instance by screw or plug means.

At least one duct 10 runs from the interior of the connection member to an orifice in the part of the mounting surface 7 covered by the valve 8. This covered part will in what follows be referred to as the assembly surface 9. In the present working example of the invention there are three such ducts 10, 10' and 10", whose orifices 11, 11' and 11" are thus all within the assembly surface 9. The ducts 10, 10' and 10" have their other ends respectively on a connection side 12, 12' and 12" of the connection member 5, where they are able to be connected with a pressure fluid lead or the like. In the present working example the three connection sides 12, 12' and 12" are on three different and directly adjacent sides of the connection member, which are at a right angle to the mounting surface 7.

The connection member 5 described in the present instance is so designed that the valve 8 may be a 3/2 way valve, whose valve ducts, not shown, are in communication with the orifices 11, 11' and 11". The one duct 10 is furthermore able to be connected with a source of fluid under pressure or with a discharge means, and furthermore the duct 10′ may be connected with a load A and lastly the duct 10″ serves as a venting duct 10″ and it is denoted $R_1$ and, respectively $R_2$ in FIG. 1. On suitable operation of the valve 8 by means of a control system, not shown, it is possible for the source P of fluid under pressure to be connected with the load A, or with the duct 10 running to the source P of fluid under pressure it is possible to establish a connection between the load A and the venting orifice $R_1$ or $R_2$, respectively. The reader is to note in this respect that the following observations are obviously not limited to this particular form of a connection member and they are quite as applicable to connection members having more than one valve on the mounting surface, such valves than being in communication with further ducts also formed in the connection member. It would also be possible to employ other designs of valves, as for instance 5/2 way valves, in which case each valve would have two ducts leading to loads, two ducts leading to venting facilities and one duct leading to a source of fluid under pressure or to an accumulator for same, such ducts being within the connection member 5.

At their ends on the respective connection side 12, 12′ and 12″ the ducts 10, 10′ and 10″ are provided not only with a threaded socket 13 extending into the duct, but also with a male nipple 14 which coaxially adjoins the duct and is integrally molded on the connection side 12, 12′ and 12″. This provides the possibility of connecting a pressure lead or the like selectively with a screw connection means or by plugging onto the nipple, so that in each case it is joined with the duct. In this respect one may distinguish between two main possible forms of the invention, of which one is illustrated in FIG. 1 and the other in FIG. 2.

In the design of FIG. 1 on the respective connection side 12, 12′ and 12″, the ducts 10, 10′ and 10″ have two separate orifices 15 and 16, which each join with a section 10*a* and 10*b* of the duct inside the connection member 5. These duct sections run together in the connection member 5 and lead via a common duct section 10*c* to the respective orifices 11, 11′ and 11″ on the mounting surface 7. Each duct 10, 10′ and 10″ is therefore composed of three duct sections 10*a*, 10*b* and 10*c*, of which the two first-mentioned sections 10*a* and 10*b* are connected in parallel with each other and run to an end separately from each other on the respective connection side. The connection nipple 14 is connected with the orifice 15 joined to the first duct section 10*a*, and a duct or passage 17 extending through the male nipple 14 is coaxially opposite to the duct section 10*a*. The threaded socket 13 is connected with the second duct section 10*b*.

There is now the advantage that a fluid pressure lead may, as required, be plugged onto the male nipple 14; or alternatively it may be screwed into the threaded socket 13. In either case there will then be a connection with the duct. The selection of the different possible form of connection will depend on the design of the fluid pressure line. The orifice that is not utilized will then be sealed off.

In order to design the connection member so that its function and the arrangement of its ports may be seen at a glance, the respective orifices 15 and 16 of each duct are placed directly adjacent to each other and are on one side of the connection member only. In the working example in accordance with FIG. 1, in order to avoid confusion of the connections the orifices of the individual ducts 10, 10′ and 10″ are arranged on different connection sides. 12, 12′ and 12″.

The reader will be able to gather further details of the embodiment of the invention shown in FIG. 1 from the account below.

Figure 2:
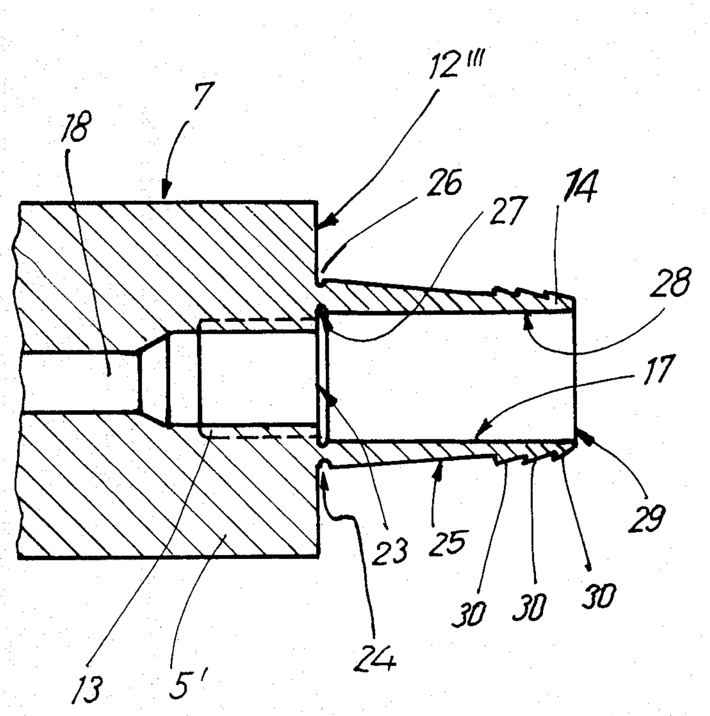
FIG. 2 is a view of part of a further working example of the invention, this time on a larger scale, in the form of a connection member in section and in a view as marked by arrow 11 in FIG. 1, the threaded socket and the male nipple being jointly connected with a single orifice of a duct within the member.

FIG. 2 is a sectional view of part of a connection member 5′ which is principle resembles the connection member 5 described wth reference to FIG. 1 and only differs therefrom with respect to the orifice part arranged on the connection sides of the ducts. Parts which have essentially the same respective functions as in FIG. 1 are therefore marked with the same references as in FIG. 1 and furthermore FIG. 2 is limited to a showing of the orifice part of a duct 18. This duct 18 leads, on the one hand, to a mounting face (not included in FIG. 2) for the attachment of valves and at its other end opens at connection side 12‴ on the connection member 5′. The departure from the working example of FIG. 2, in respect of the duct 18 at the connection side 12‴, is however only that there is a single orifice 23, which connects both with the threaded socket 13 and also the male nipple 14; or in other words the threaded socket 13 extends some distance into the interior of the duct 18, whereas the male nipple 14 is directly connected with it as a coaxial extension thereof. The male nipple 14 has a round cross section to its interior through passage or duct 17, and the latter is arranged coaxially downstream from the threaded socket 13 and its orifice 23.

In the case of this embodiment of the invention of FIG. 2 as well, it is possible for the type of connection of a pressure fluid lead and the duct to be any one of two different possibilities as may be selected. On the one hand there is the possibility of detachably connecting a pressure fluid lead on the male nipple or of connecting a lead by screwing it into the threaded socket after snapping off the male nipple 14.

Both the embodiments illustrated in FIGS. 1 and 2 share the advantage that in accordance with particular circumstances it is possible to make a selection between two forms of joint between the pressure fluid lead and the ducts. In fact, it frequently happens that a connection member of the invention will have to be connected with a piece of pressure fluid lead, which however is only in the form of hose without any special purpose terminations or only in the form of a lead with such terminations adapted to be screwed into the socket. It is then possible without using any intermediate adapter to connect such flexible tube to the connection member. It is even possible for one and the same connection member to be connected with a screw or a plug-on connection which are side by side. A single connection member is therefore able to be used for both modes of joint. It will furthermore be clear that the stocking of components may be substantially cut down since, for the connection of the pressure fluid leads or the like, it suffices to have a single member, that is to say the connection member. A further significant point is that the assembly and fitting time for the mounting of the pressure fluid leads on the connection member, may be greatly reduced. It is preferred for the connection member 5 or 5′ to be in the form of a single part which is produced by casting or injection molding. This makes possible simple and rapid production. In this respect the connection member is advantageously fabricated of synthetic resin material or hard rubber, something that is conducive of a light weight. In addition, in the latter case with a screw connection between a pressure fluid lead and the connection member, it is even possible to dispense with a separate seal or gasket, if the two corresponding threads are so matched that they bite into each other with a sealing effect.

In the two embodiments of the invention viewed in the drawings, the male nipples 14 are frangible in the sense that they have lines or points of weakness and are able to be broken off from the respective connection side 12, 12' and 12". For this purpose each male nipple has its own point of weakness 24 which is provided directly adjacent to the respective nipple side or the respective orifice 15 and 23. If now the user subjects the nipple to a bending force in a transverse direction, the nipple will snap off in an exactly defined manner neatly at the point 24 of weakness. This point of weakness preferably comprises an external circumferential groove 26 made in the outer surface 25 of the male nipple 14 so as to define the position at which breakage commences on fracturing the male nipple 14. In order to obtain a smooth or regular break, and to avoid any splintering of the male nipple on breaking it off, the point 24 of intended breakage includes an internal circumferential groove 27 placed concentrically in relation to the point 24 of weakness, and the internal groove 27 is cut into the internal face 28 of the passage 17 in the male nipple 14.

In order to further perfect the line of breakage, it is possible for the groove floor of the external circumferential groove and/or of the internal circumferential groove 27 to be made with sharp corners so that when the male nipple is acted upon by the breaking force there will initially be an extremely high concentration of strains here.

It is furthermore advantageous if the point of weakness 24 or its circumferential grooves 26 and 27 are placed somewhere adjacent to the side 12, 12', or 12'" and the orifices 15 and 23 directly adjacent thereto and are contiguous with the male nipple side and the respective orifice. This will ensure a breaking off of the male nipple without the production of jagged edges and there will be practically no interfering edges on the nipple side around the orifice 15 and 23. This for its part makes it possible for the orifice 15 to be shut off with a plug or for it to be connected with a pressure fluid lead in the orifice without any sealing problems.

In order to firmly retain the pressure lead on the male nipple 14, the latter tapers towards its free end 29 conically to a slight extent and the outer surface 25 is provided with one or more coaxial barbs 30 which are preferably made with a cross section resembling a saw tooth. Such barbs are able to bite or press into the inner face of the pressure fluid lead that is to be placed on the male nipple so that it is retained in place.

With reference to FIG. 1 some further details of the different possibilities of connection of pressure fluid leads or the like with the ducts 10, 10' and 10" will be provided. As an example the orifice 16 associated with the threaded socket 13 of the duct 10 leading to the pressure fluid supply P is connected with a pressure lead 31 having a threaded ferrule 30'. In order to ensure that air flows in the desired direction from the pressure supply P to the orifice 11 on the mounting surface 7, only the male nipple 14 associated with the second orifice 15 has been broken off and removed and its place taken by a plug 32 or stopper to provide a seal. For this purpose the plug 32 in this form of the invention has a portion 33 with a circular cylindrical outline, matching the inner face of the duct section **10*a*, and it is pressed into the said section. An adjoining head part 34 having a larger diameter presses a sealing ring 35 against the connection side 12. It is however also possible for the duct section 10*a*** to be permanently shut off with a plug, as for example if the same is bonded in place. In this case no sealing means will be required.

In the case of the oppositely located duct 10" leading to the load A the duct section **10*b* having the threaded socket 10*b* is closed by a screw plug 36. Accordingly the male nipple 14 placed parallel to the duct section 10*a* will not be broken off at the connection side 12' and a hose-like fluid pressure lead 36'** has been detachably slipped over it, same having elastic properties like those of rubber. Its leads to the load A are not depicted.

In the case of the duct 10' serving for venting the two duct sections **10*a* and 10*b*, the orifices on the connection side 12' are not shut off and the male nipple 14 has not been detached. It would be possible to have a pressure fluid lead fixed to the one orifice in the manner noted above. However, this is not absolutely necessary in the case of the present embodiment of the invention and the air will escape from the duct 10' directly into the surrounding atmosphere so that both the orifices 15 and 16 may remain open. It will be clear however that in order to cut down the space requirement the nipple 14 may be snapped off if desired without then closing the duct 10*a*** joining it.

The embodiment of FIG. 2 has the advantage of that of FIG. 1 that no plugs or screw stoppers are required, since there is only one single orifice at the outer end of each duct. In the case of this design it is even possible for the internal diameter of the through duct 17 in the male nipple 14 to be made somewhat larger than the diameter of the threaded socket 13 so that in some cases it will even be possible for a pressure fluid lead to be screwed directly into the threaded socket 13 without first having to remove the male nipple 14. Such a design will be more particularly advantageous if the pressure fluid leads are to be frequently changed for other different leads.

I claim:

1. In a connection member with a prismatic form adapted for having at least one valve mounted on it and having at least one duct therein, said duct extending from a first orifice at a valve mounting surface of the connection member adapted to carry such valve, to a second orifice on a connection side of the member, the improvement that at the connection side of said member the second orifice of the at least one duct in said connection member is in the form of both a socket with a female thread therein and a male nipple projecting from the connection side, both said socket and said nipple being connected with one of two sections of said at least one duct in said connection member to enable a length of pressure fluid lead to be connected with said male nipple and said socket alternatively at will.

2. The connection member as claimed in claim 1 wherein said two duct sections are parallel to each other.

3. The connection member as claimed in claim 1 wherein one of said duct sections associated with the threaded socket is parallel to said at least one duct.

4. The connection member as claimed in claim 1 wherein said second orifice of said at least one duct at said connection side of said member has two orifice sections of which one constitutes said male nipple and of which the other constitutes said socket.

5. The connection member as claimed in claim 4 wherein said two orifice sections of said at least one duct are placed directly adjacent to each other on said connection surface.

6. The connection member as claimed in claim 1 wherein said orifice is defined by both said male nipple and said socket which are arranged with a single passage portion extending therethrough.

7. The connection member as claimed in claim 6 wherein said male nipple and said socket are placed coaxially to each other.

8. The connection member as claimed in claim 1 wherein said male nipple is molded on said connection side so that it may be frangibly detached therefrom.

9. The connection member as claimed in claim 8 wherein said male nipple is connected with said connection side with a point of weakness therebetween so that said frangible detachment takes place with a fracture at said point of weakness.

10. The connection member as claimed in claim 9 wherein said point of weakness is in the form of an external circumferential groove in an outer face of said male nipple.

11. The connection member as claimed in claim 10 wherein said point of weakness is defined by said circumferential groove, and a further coaxial and coplanar groove within it, in an internal face of said nipple defining a passage therethrough.

12. The connection member as claimed in claim 10 wherein said at least one groove has sharp inner corners at a floor thereof.

13. The connection member as claimed in claim 12 whrerein the said grooves are placed adjacent to an outer face of said member.

14. The connection member as claimed in claim 13 wherein said grooves are so designed that said nipple may be broken off in a manner free of jagged edges.

15. The connection member as claimed in claim 1 wherein said socket is adapted to receive a sealing plug therein after breaking off of said nipple.

16. The connection member as claimed in claim 15 wherein said plug may be detachably pressed into said duct.

17. The connection member as claimed in claim 15 wherein said plug is secured in said socket by bonding.

18. A fluid connection device comprising: a fluid connection member including a connection side and a mounting surface adapted to have a valve mounted thereon said connection member having at least one duct extending from a first orifice at said mounting surface to a second orifice at said connection side; a female threaded portion formed within said at least one duct adjacent said second orifice; and, a male nipple, formed integrally with said connection member at said connection side and operatively connected to said second orifice adjacent said second orifice thereby said second orifice having both male and female connections.

19. A fluid connection device according to claim 18 wherein: said male nipple is formed so as to be frangibly detachable from said connection side.

20. A fluid connection device comprising: a fluid connection member including a connection side and a mounting surface adapted to have a valve mounted thereon said connection member having at least one duct extending from a first orifice at said mounting surface to a second orifice at said connection side; a female threaded portion integrally formed within said at least one duct adjacent said second orifice; and, a male nipple integrally formed with said connection member adjacent said second orifice and operably connected to said duct, said male nipple being formed so as to be frangibly detachable from said fluid connection member thereby providing a connection member with both female and male connections.

* * * * *